US012725218B1

(12) United States Patent
Karst

(10) Patent No.: US 12,725,218 B1
(45) Date of Patent: Sep. 1, 2026

(54) MARKING CONTENT PREVIOUSLY CAPTURED BY AN IMAGE CAPTURE DEVICE

(71) Applicant: GoPro, Inc., San Mateo, CA (US)

(72) Inventor: Alexandre Karst, Paris (FR)

(73) Assignee: GoPro, Inc., San Mateo, CA (US)

( * ) Notice: Subject to any disclaimer, the term of this patent is extended or adjusted under 35 U.S.C. 154(b) by 360 days.

(21) Appl. No.: 18/518,342

(22) Filed: Nov. 22, 2023

(51) Int. Cl.
*G06T 1/00* (2006.01)
*G10L 15/22* (2006.01)

(52) U.S. Cl.
CPC ...... *G06T 1/0021* (2013.01); *G10L 2015/223* (2013.01)

(58) Field of Classification Search
CPC ........................ G06T 1/0021; G10L 2015/233
See application file for complete search history.

(56) References Cited

U.S. PATENT DOCUMENTS

2003/0218624 A1* 11/2003 Quintana ........... H04N 1/32122 707/E17.031
2017/0019580 A1* 1/2017 Boghosian ............. G11B 27/10

* cited by examiner

*Primary Examiner* — Antoinette T Spinks
(74) *Attorney, Agent, or Firm* — Esplin & Associates, PC

(57) ABSTRACT

An image capture device may capture content (e.g., visual content, audio content). After the content has been captured, a user may interact with the image capture device to mark the captured content. The content previously captured by the image capture device may be marked (e.g., highlighted, favorited, ranked) without requiring the user to review (e.g., view, listen to) the captured content.

20 Claims, 5 Drawing Sheets

MARKING CONTENT PREVIOUSLY CAPTURED BY AN IMAGE CAPTURE DEVICE

FIELD

This disclosure relates to marking content previously captured by an image capture device.

BACKGROUND

A user may use an image capture device to capture content (e.g., visual content, audio content). Manually reviewing the captured content to determine desirability of the captured content (e.g., whether a video clip includes a good shot or a bad shot/interesting shot or an uninteresting shot) may be time consuming.

SUMMARY

This disclosure relates to marking content previously captured by an image capture device. The image capture device may include a housing. The housing may carry one or more of an optical element, an image sensor, and/or other components. The optical element may guide light within a field of view to the image sensor. The image sensor may generate a visual output signal conveying visual information based on light that becomes incident thereon. The visual information may define visual content. First visual content may be captured based on the visual information conveyed by the visual output signal and/or other information. After the capture of the first visual content, a user interaction with the image capture device to mark captured visual content may be detected. Responsive to detection of the user interaction with the image capture device to mark the captured visual content, the first visual content may be marked.

A housing may carry one or more components of an image capture device. The housing may carry (be attached to, support, hold, and/or otherwise carry) one or more of an electronic storage, an optical element, an image sensor, a processor, and/or other components. In some implementations, the housing may carry one or more sound sensors. In some implementations, the housing may carry one or more electronic displays.

The electronic storage may store information relating to the image capture device, information relating to components of the image capture device, visual information, information relating to visual content captured by the image capture device, information relating to user interaction with the image capture device, information relating to marking of visual content captured by the image capture device, and/or other information.

The optical element may be configured to guide light within a field of view to the image sensor. The field of view may be less than 180 degrees. The field of view may be equal to 180 degrees. The field of view may be greater than 180 degrees.

The image sensor may be configured to generate a visual output signal and/or other output signals based on light that becomes incident thereon and/or other information. The visual output signal may convey visual information and/or other information. The visual information may define visual content having the field of view.

The sound sensor may be configured to generate an audio output signal and/or other output signals based on sounds received by the sound sensor and/or other information. The audio output signal may convey audio information and/or other information. The audio information may define audio content.

The electronic display may be configured to visually present information.

The processor(s) may be configured by machine-readable instructions.

Executing the machine-readable instructions may cause the processor(s) to facilitate marking previously captured content. The machine-readable instructions may include one or more computer program components. The computer program components may include one or more of a user interaction component, a content capture component, a mark component, and/or other computer program components.

The user interaction component may be configured to detect one or more user interactions with the image capture device. The user interaction component may be configured to detect user interaction(s) with physical button(s), virtual button(s), and/or other user interface components of the image capture device. The user interaction component may be configured to detect user interaction(s) with the image capture device to capture content (e.g., visual content, audio content, etc.). The user interaction component may be configured to detect user interaction(s) with the image capture device to start capture of content. The user interaction component may be configured to detect user interaction(s) with the image capture device to stop capture of content.

The user interaction component may be configured to detect user interaction(s) with the image capture device to mark captured content (e.g., captured visual content, captured audio content, etc.). The user interaction component may be configured to detect user interaction(s) with the image capture device to mark captured content after the capture of the content. For example, after capture of visual content, the user interaction component may be configured to detect user interaction(s) with the image capture device to mark the captured visual content.

In some implementations, the user interaction(s) with the image capture device to mark captured content may include user interaction(s) with one or more physical buttons and/or one or more virtual buttons of the image capture device. The physical button(s) of the image capture device may include a power button and/or other physical button(s) of the image capture device.

In some implementations, the user interaction(s) with the image capture device may include speaking of one or more voice commands. For example, the user interaction(s) with the image capture device to mark captured content may include speaking voice command(s).

In some implementations, the user interaction(s) with the image capture device to mark captured content may be detected while the captured content is not being played by the image capture device. For example, the user interaction(s) with the image capture device to mark the captured visual content may be detected while the captured visual content is not being presented on the electronic display.

In some implementations, the user interaction(s) with the image capture device to mark captured content may be detected while the image capture device is capturing other content. For example, second visual content may be captured after the capture of first visual content. The user interaction(s) with the image capture device to mark the first visual content captured by the image capture device may be detected during the capture of the second visual content by the image capture device.

The content capture component may be configured to capture content (e.g., visual content, audio content, etc.).

The content capture component may be configured to capture visual content based on the visual information conveyed by the visual output signal and/or other information. The content capture component may be configured to capture separate visual content are separate times. For example, the content capture component may be configured to capture first visual content and/or other content. After the capture of the first visual content, the content capture component may be configured to capture second visual content and/or other content.

The mark component may be configured to mark captured content (e.g., captured visual content, captured audio content, etc.). The mark component may be configured to mark captured content responsive to detection of the user interaction(s) with the image capture device to mark the captured content. For example, responsive to detection of the user interaction(s) with the image capture device to mark captured visual content, the mark component may be configured to mark the captured visual content. The mark component may be configured to mark the latest content captured by the image capture device.

In some implementations, the mark component may be configured to not mark the content being captured by the image capture device when the user interaction(s) with the image capture device to mark the captured content is detected. For example, second visual content may be captured after the capture of first visual content. The user interaction(s) with the image capture device to mark the first visual content captured by the image capture device may be detected during the capture of the second visual content by the image capture device. Responsive to the user interaction(s) with the image capture device to mark the first visual content captured by the image capture device being detected during the capture of the second visual content by the image capture device, the mark component may mark the first visual content but not mark the second visual content.

In some implementations, the capture content may be marked with ranking of the captured content. For example, captured visual content may be marked with ranking of the captured visual content.

In some implementations, confirmation of the marking of the captured content may be presented on the electronic display.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
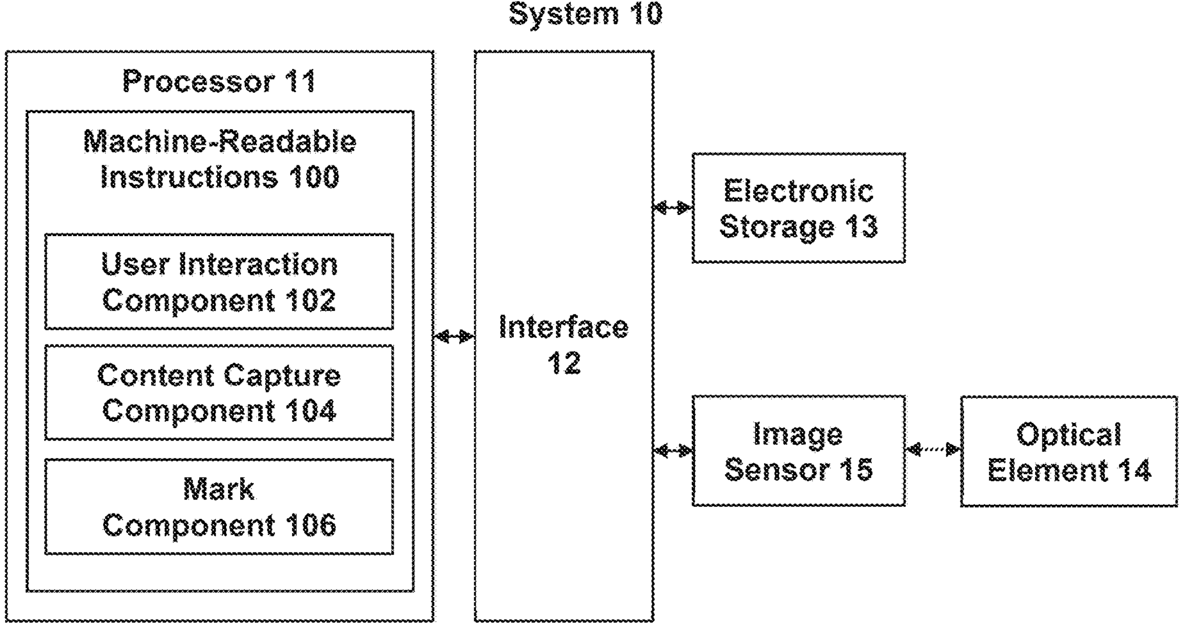
FIG. 1 illustrates an example system for marking content previously captured by an image capture device.

FIG. 1 illustrates a system 10 for marking content previously captured by an image capture device. The system 10 may include one or more of a processor 11, an interface 12 (e.g., bus, wireless interface), an electronic storage 13, an optical element 14, an image sensor 15, and/or other components. The optical element 14 may guide light within a field of view to the image sensor 15. The image sensor 15 may generate a visual output signal conveying visual information based on light that becomes incident thereon. The visual information may define visual content. First visual content may be captured by the processor 11 based on the visual information conveyed by the visual output signal and/or other information. After the capture of the first visual content, a user interaction with the image capture device to mark captured visual content may be detected by the processor 11. Responsive to detection of the user interaction with the image capture device to mark the captured visual content, the first visual content may be marked by the processor 11.

The system 10 may include and/or be part of an image capture device. The image capture device may include a housing, and one or more of the electronic storage 13, the optical element 14, the image sensor 15, and/or other components of the system 10 may be carried by the housing of the image capture device. The image capture device may capture content (e.g., visual content, audio content). After the content has been captured, a user may interact with the image capture device to mark the captured content. The content previously captured by the image capture device may be marked (e.g., highlighted, favorited, ranked) without requiring the user to review (e.g., view, listen to) the captured content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, visual information, information relating to visual content captured by the image capture device, information relating to user interaction with the image capture device, information relating to marking of visual content captured by the image capture device, and/or other information. The electronic storage 13 may include non-transitory, machine-readable storage media. The non-transitory machine-readable storage media may include permanent memory and/or temporary memory. The electronic storage 13/the non-transitory, machine-readable storage media may store information defining content that has been captured by the image capture device.

Visual content may refer to content of image(s), video frame(s), and/or video(s) that may be consumed visually. For example, visual content may be included within one or more images and/or one or more video frames of a video. The video frame(s) may define/contain the visual content of the video. That is, a video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

The sound(s) within the audio content may correspond to the sound(s) that were captured when capturing the visual content. For example, the visual content may include a visual capture of an activity involving one or more persons and the audio content may include sound capture of the activity, which may include sounds produced by persons or non-persons (e.g., animals, machines, objects). One or more portions of the audio content may include capture of voice of one or more persons and/or other sounds. Voice may refer to vocal sounds made by a person. Voice may be directed to one or more persons or one or more non-persons. Voice may include part of a spoken word/sound, one or more spoken words/sounds, and/or other vocal sounds. For example, voice may include speech, singing, shouting, cheering, yelling, screaming, booing, and/or other types of voice.

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic storage 13, the optical element 14, and/or the image sensor 15, of the system 10 may be carried by the housing of the image capture device. The housing of the image capture device may carry other components of the system 10, such as the processor 11. References to the housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

Figure 3:
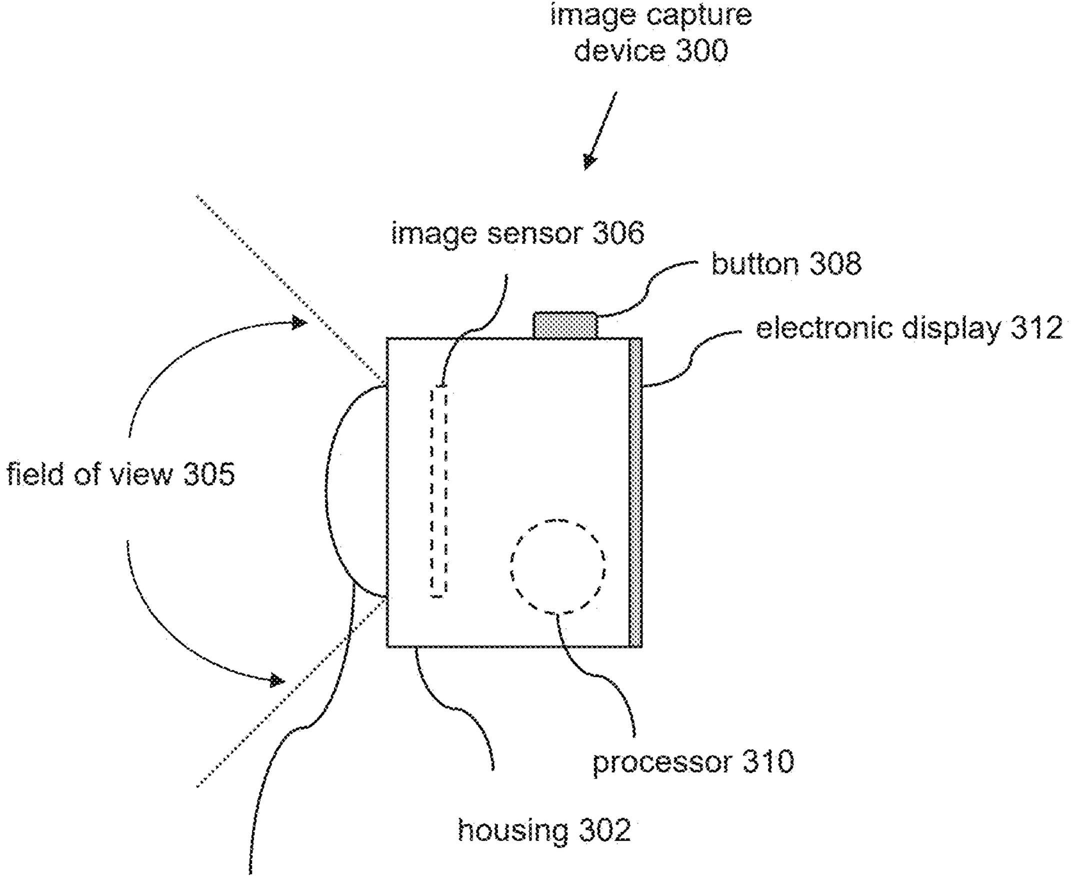
FIG. 3 illustrates an example image capture device.

FIG. 3 illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of an optical element 304, an image sensor 306, a button 308, a processor 310, an electronic display 312, and/or other components.

One or more components of the image capture device 300 may be the same as, be similar to, and/or correspond to one or more components of the system 10. For example, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The image capture device 300 may include other components not shown in FIG. 3. The image capture device 300 may not include one or more components shown in FIG. 3. For example, an image capture device may include multiple electronic displays (e.g., front-facing electronic display, back-facing electronic display). An image capture device may include one or more sound sensors. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating image content (e.g., content of image(s) and/or video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple optical elements. For instance, the image capture device 300 may include two image sensors configured to receive light from two optical elements positioned on opposing sides of the housing 302. The fields of views of the optical elements may overlap and enable capture of spherical images and/or spherical videos.

The image capture device 300 may include other sensors. For example, the image capture device 300 may include one or more sound sensors to capture audio content. A sound sensor may include sensor(s) (e.g., microphone, component(s) of microphone) that converts received sounds into output signals. The output signals may include electrical signals. The sound sensor may generate output signals conveying information based on sounds received by the sound sensor. For example, the sound sensor may be configured to generate an audio output signal conveying audio information based on the sounds received by the sound sensor. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats.

The image capture device 300 may include one or more location sensors (e.g., GPS sensors) to measure location of the image capture device and/or one or more position sensors (e.g., gyroscope, accelerometer, inertial measurement unit) to measure position, movement, and/or orientation of the image capture device. In some implementations, information about location, position, and/or movement of the image capture device may be stored as metadata of other content (e.g., visual content, audio content) captured by the image capture device.

The button 308 may refer to one or more physical mechanisms that may be physically interacted upon by a user. The button 308 may be interacted upon by a user to operate the button 308 and provide one or more commands to the image capture device 300. For example, a user may interact with the button 308 to provide one or more commands to the image capture device 300 to start content capture, to stop content capture, to mark previously captured content, and/or to otherwise operate the image capture device 300. The button 308 may be a shutter button (e.g., a button used to capture images, videos, and/or other content), a power button, a special mode button, a mode switch button, a quick capture button, a setting button, and/or other button. In some implementations, the button 308 may include a dedicated button with the user interaction of the button 308 causing specific operation/functionality (e.g., start/stop record, power on/off). In some implementations, the button 308 may include a multi-purpose button with the user interaction of the button 308 causing different operations/functionalities (e.g., based on different context in which the image capture device 300 is operating, based on user specifying the use of the button 308).

The button 308 may be configured to be interacted upon by a user of the image capture device. The button 308 may be configured to be interacted upon by the user before, during, and/or after capture of content by the image capture device. The button 308 may be configured to receive different types of user interaction. A type of user interaction may refer to a category, a way, a form, and/or kind of user interaction. A type of user interaction may be defined by different physical interactions of the user with the button 308 (e.g., press, pull, twist, flip, click, press-and-hold), different timing of physical interaction of the user with the button 308 (e.g., a short-press, a long press, a combination/sequence of button presses), and/or other user interaction with the button 308.

While a single physical button is shown in FIG. 3, this is merely as an example and is not meant to be limiting. In some implementations, the image capture device 300 may include multiple physical buttons. In some implementations, the function of the button 308 may be performed by a virtual button presented on the electronic display 312. Other types and/or configurations of buttons are contemplated.

The electronic display 312 may include an electronic device that provides visual presentation of information. The electronic display 312 may include a color display and/or a non-color display. The electronic display 312 may be configured to visually present information. The electronic display 312 may be configured to present visual content, user interface, and/or other information. User interface (graphical user interface) may include a graphical form that enables a user to interact with the image capture device 300 and/or see information provided by the image capture device 300. A button presented on the electronic display 312 may be referred to as a virtual button.

The electronic display 312 may include one or more touchscreen displays. The electronic display 312 may be configured to receive user input via a user's engagement with the electronic display 312. A user may engage with the electronic display 312 via interaction with one or more touch-sensitive surfaces/screens and/or other components of the electronic display 312. The electronic display 312 may be configured to receive user input to control the operation of the image capture device (e.g., change setting, start recording, stop recording, mark previously captured content). For example, the electronic display 312 may present one or more options for a user to provide input to the image capture device 300, such as by presenting one or more virtual (soft) buttons. The user may control the operation of the image capture device 300 by engaging one or more fingers on the location of the electronic display 312 corresponding to the virtual button(s). The electronic display 312 may be configured to generate output signals indicating location of the user's engagement with the electronic display 312. User input (to control the operation of the image capture device) may be received/determined based on the output signals generated by the electronic display 312.

The electronic display 312 may include one or more touch-sensitive screens and/or other components. A user may engage with the electronic display 312 by touching one or more portions of a touch-sensitive screen (e.g., with one or more fingers, stylus). A user may engage with the electronic display 312 at a moment in time, at multiple moments in time, during a period, and/or during multiple periods. For example, a user may tap on, hold, or move along the electronic display 312 to provide input to the image capture device. For example, a user may tap on and/or hold a finger on a portion of the electronic display 312 corresponding to a virtual button to provide input to the image capture device.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3, the processor 310 may facilitate operation of the image capture device 300 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

A user may use the image capture device 300 to capture content (e.g., visual content, audio content), such as images and/or videos. The user may not wish to keep all the content captured using the image capture device 300. For example, the user may wish to capture a video of riding a wave during surfing and may capture many videos before a video of the wave ride is actually captured. The user may wish to capture a certain view in an image or a video, but the view in the captured image/video may be ruined, such as due to something entering into the field of view of the image capture device 300 and ruining the composition. The user may capture unwanted images/videos by accidentally tapping the record button. The user may not wish to keep such unwanted content, but manually reviewing the captured content to identify and delete the unwanted content may be time consuming.

The user may not be able to look at the image capture device to review the last captured content. For example, the user may be capturing a video while riding a skateboard and may be able to start/stop a recording by pressing the record button with a finger, but the user may not be able to take their eyes off the road to review and mark/delete the last captured content.

Additionally, manually reviewing and/or deleting the captured content directly after capture may interfere with capture of wanted content. For example, the user may wish to delete the latest content captured by the image capture device 300. While the user is pulling up the content or deleting the content, the view that the user wished to capture may occur. Because the user was engaged in review and deletion of unwanted content, the user may miss capturing wanted content.

Moreover, manually reviewing and/or deleting the captured content may require multiple actions, such as waking/unlocking the electronic display 312, pulling up the list of captured content, selecting the captured content, and tapping on a "mark" button to mark the content or a "delete" button to delete the content. Such interaction with the image capture device 300 may require use of both hands, which may not be possible when the user is engaged in an activity that requires at least one hand to be kept free. The user may not have sufficient time to complete all the actions required to review and/or delete the captured content.

The processor 310 may capture content, such as images and/or videos, using the sensors of the image capture device 300. After content capture has finished, the processor 310 may detect user interaction with the image capture device to mark the captured content. For example, after an image or a video has been captured, the process 310 may detect user interaction with the button 308 (e.g., a specific button press, a specific sequence of button presses) and/or one or more virtual buttons presented on the electronic display 312 (e.g., a specific virtual button press, a specific sequence of virtual button presses) that provides a command to the processor 310 to mark the latest captured content. The user may physically interact with the button 308 and/or the virtual button(s) using one hand. As another example, a user may interact with the image capture device 300 by speaking a voice command associated with marking of captured content. The user may interact with the image capture device 300 without looking at the image capture device 300.

When such user interaction is detected, the processor 310 may mark the latest captured content, such as the latest captured image/video. Marking the captured content may include associating the captured content with information that indicates the desirability/quality of the captured content. Marking the captured content may include adding information for/into the captured content that indicates the desirability/quality of the captured content. Marking the captured content may include tagging the captured content with information that indicates the desirability/quality of the captured content. For example, marking an image or a video may include inserting information into the metadata of the image/video that indicates the user's ranking of the image/video (e.g., good shot, bad shot, favorite shot, delete shot, number/character reflecting the ranking).

The user interaction to mark the captured content may be received, detected, and used by the image capture device 300 to mark the captured content without requiring the user to pull up/show/play the captured content. The user interaction to mark the captured content may be received, detected, and used by the image capture device 300 to mark the captured content while the image capture device 300 is operating to capture other content. For example, rather than requiring the user to interact with the image capture device 300 to pull up an image/video in a gallery view, select the image/video, and then mark the image/video as including a good/bad shot, the user may interact with a specific button of the image capture device 300 to mark the latest captured image/video as being a good/bad shot. The user may interact with a specific button of the image capture device 300 to mark the latest captured image/video as being a good/bad shot while the image capture device 300 is capturing other content. For example, the user interaction to mark the captured content may be received while the image capture device 300 is providing a preview of the scene currently being observed by the image capture device 300 on the electronic display 312 and/or while the image capture device 300 is capturing a new image/video.

Such marking of captured content may enable the user to rank the capture content without have to manually review the captured content. Such marking of captured content may enable continued use of the image capture device 300 to capture content. Previously content captured by the image capture device 300 may be marked while the image capture device 300 is being used to capture other content.

Such marking of captured content may facilitate user review of captured content. The marking of the captured content may be presented with the captured content. For example, when the captured content is being reviewed on the image capture device 300 and/or another computing device (e.g., mobile device), such as in a gallery view, previews/thumbnails of the captured content may be presented with the marking (e.g., good shot, bad shot, favorite shot, delete shot, number/character reflecting the ranking) made after the content was captured. Presentation of the marking may assist the user in deciding which content should be played, saved, moved, and/or deleted. Presentation of the marking may reduce the amount of time the user spends to find good shots/remove bad shots. Presentation of the marking may assist the user in freeing up storage (e.g., local storage, online storage) by removing bad shots. The user may provide provided with an option to automatically delete captured content marked for deletion. The user may be provided with automatic reminders to delete bad shots.

The image capture device 300 may provide confirmation of the captured content being marked. The image capture device 300 may visually, audibly, and/or haptically indicate that the captured content has been marked. For example, marking of the captured content may be visually indicated by one or more text/images presented on the electronic display 312 and/or one or more lights of the image capture device 300 being turned on (e.g., steady or blinking LED on the image capture device 300, color of LED on the image capture device 300). Marking of the captured content may be audibly indicated by sound produced via one or more speakers of the image capture device 300 (e.g., marking message, beeping sound). Marking of the captured content may be haptically indicated by vibration of the image capture device 300. Other indications to confirm the marking of the captured content are contemplated.

Figure 4:
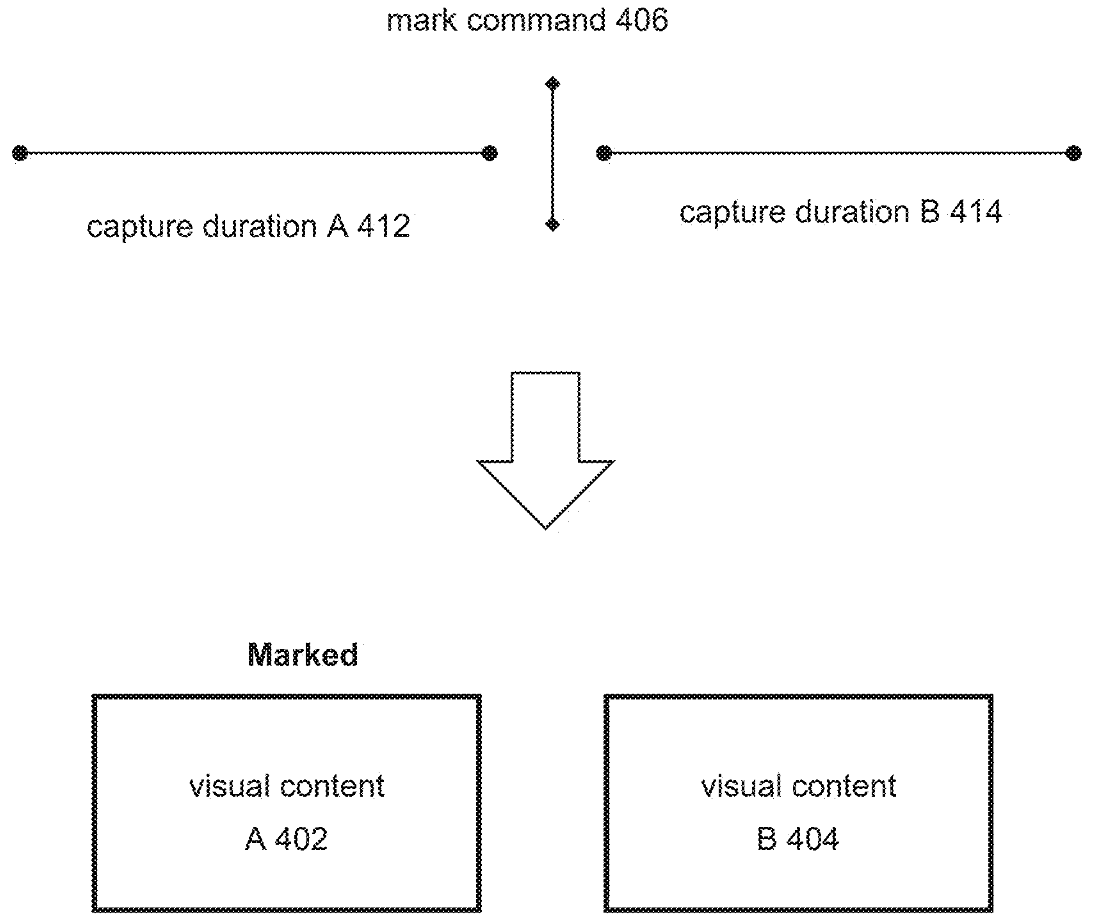
FIG. 4 illustrates an example marking of visual content previously captured by an image capture device.

FIG. 4 illustrates an example marking of visual content previously captured by an image capture device. In this example, the image capture device may be used to capture visual content A 402 (e.g., video A) and visual content B 404 (e.g., video B). The visual content A 402 may be captured during a capture duration A 412 and the visual content B 404 may be captured during a capture duration B 414. A time duration may exist between the capture duration A 412 and the capture duration B 414. For example, the image capture device may have been used to record video A. After recording video A, the user may have waited for a duration of time before starting to record video B.

A mark command 406 may be received by the image capture device after finishing capture of the visual content A 402 but before the start of capture of the visual content B 404. For example, the mark command 406 may be received after the image capture device has finished recording video A but before the image capture device starts recording video B. The mark command 406 may be received based on the user's interaction with the image capture device to mark captured visual content.

Responsive to the mark command 406, the image capture device may mark the latest captured visual content. Responsive to the mark command 406, the image capture device may mark the visual content that was last captured (capture finished). Responsive to the mark command 406, the image capture device may mark the last image/video that was recorded by the image capture device before reception of the mark command 406. The image capture device may mark the visual content A 402 (recorded video A). Responsive to the mark command 406, the image capture device may not mark the visual content captured after reception of the mark command 406. The image capture device may not mark the visual content B 404 (video B recorded after the mark command 406).

Figure 5:
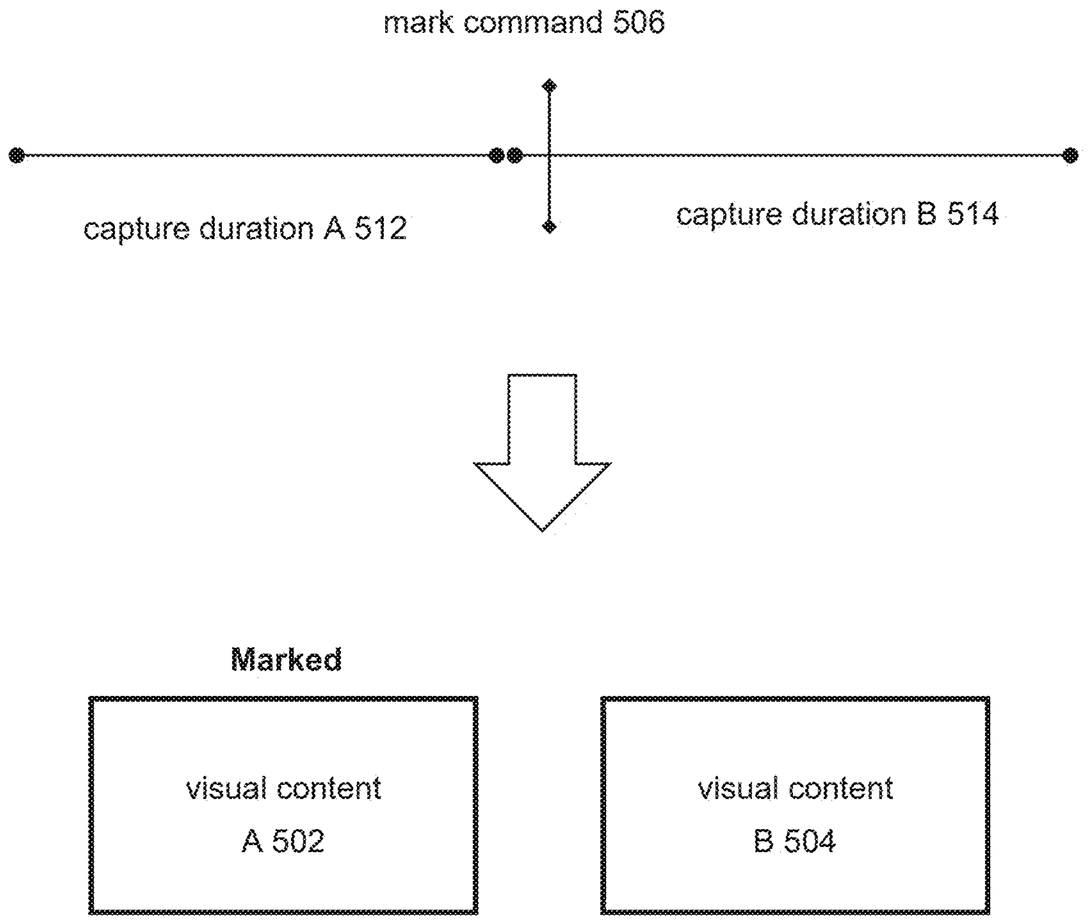
FIG. 5 illustrates an example marking of visual content previously captured by an image capture device.

FIG. 5 illustrates an example marking of visual content previously captured by an image capture device. In this example, the image capture device may be used to capture visual content A 502 (e.g., video A) and visual content B 504 (e.g., video B). The visual content A 502 may be captured during a capture duration A 512 and the visual content B 504 may be captured during a capture duration B 514. The capture duration B 514 may follow the capture duration A 512. For example, the image capture device may have been used to record video A. Immediately after recording video A, the user may have started to record video B.

A mark command 506 may be received by the image capture device after finishing capture of the visual content A 502 and after the start of capture of the visual content B 504. For example, the mark command 506 may be received after the image capture device has finished recording video A and after the image capture device has started recording video B. The mark command 506 may be received based on the user's interaction with the image capture device to mark captured visual content.

Responsive to the mark command 506, the image capture device may mark the latest captured visual content. Responsive to the mark command 506, the image capture device may mark the visual content that was last captured (capture finished). Responsive to the mark command 506, the image capture device may mark the last image/video that was recorded by the image capture device before reception of the mark command 506. The image capture device may mark the visual content A 502 (recorded video A). Responsive to the mark command 506, the image capture device may not mark the visual content captured after reception of the mark command 506. Responsive to the mark command 506, the image capture device may not mark the visual content that was being captured when the mark command 506 was received. The image capture device may not mark the visual content B 504 (video B with recording started before the mark command 406 but finished after the mark command 506).

Referring back to FIG. 1, the processor 11 (or one or more components of the processor 11) may be configured to obtain information to facilitate marking previously captured content. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate marking previously captured content. The machine-readable instructions 100 may include one or more computer program components. The machine-readable instructions 100 may include one or more of a user interaction component 102, a content capture component 104, a mark component 106, and/or other computer program components.

The user interaction component 102 may be configured to detect one or more user interactions with an image capture device. A user interaction with an image capture device may refer to how a user acts on/with the image capture device. A user interaction with an image capture device may include user interaction(s) with one or more physical buttons and/or one or more virtual buttons of the image capture device. The physical button(s) of the image capture device may include a shutter button, a power button, a special mode button, a mode switch button, a quick capture button, a setting button, and/or other physical button(s) of the image capture device. A user interaction with an image capture device may include speaking of one or more voice commands.

Detecting a user interaction with an image capture device may include one or more of determining, discerning, discovering, finding, identifying, spotting, and/or otherwise detecting the user interaction with the image capture device. Detecting a user interaction with an image capture device may include detecting how the user interacted with the image capture device. Detecting a user interaction with an image capture device may include detecting types of user interaction with the image capture device. The user interaction component 102 may be configured to detect user interaction(s) with physical button(s), virtual button(s), and/or other user interface components (e.g., voice commands) of the image capture device.

The user interaction component 102 may be configured to detect user interaction(s) with the image capture device to control capture of content. The user interaction component 102 may be configured to detect user interaction(s) with the image capture device to capture content (e.g., visual content, audio content, etc.). The user interaction component 102 may be configured to detect user interaction(s) with the image capture device to start capture of content. The user interaction component 102 may be configured to detect user interaction(s) with the image capture device to stop capture of content. For example, the user interaction component 102 may detect press of a particular button, press of combination of buttons, sequential press of buttons (e.g., pattern of button presses), and/or voice command that provides input/command to the image capture device to record an image or a video.

The user interaction component 102 may be configured to detect user interaction(s) with the image capture device to control marking of captured content. The user interaction component 102 may be configured to detect user interaction(s) with the image capture device to mark captured content (e.g., captured visual content, captured audio content, etc.). The user interaction component 102 may be configured to detect user interaction(s) with the image capture device to mark captured content after the capture of the content. The user interaction component 102 may be configured to detect user interaction(s) with the image capture device to mark content (latest content) where the capture has finished. For example, the user interaction component 102 may detect press of a particular button, press of combination of buttons, sequential press of buttons (e.g., pattern of button presses), and/or voice command that provides input/command to the image capture device to mark the latest image/video that has been captured/recorded.

For example, after capture of an image or a video by the image capture device, the user may double-press the power button of the image capture device. The double press of the power button may be detected and interpreted as a command to mark the latest captured image/video. As another example, after capture of an image or a video by the image capture device, the user may speak a voice command. The voice command may be detected and interpreted as a command to mark the latest captured image/video.

In some implementations, different user interactions with the image capture device may be associated with different marking of the captured content. For example, one type of user interaction with the image capture device may be interpreted as a command to mark the latest captured content as being a bad shot while another type of user interaction with the image capture device may be interpreted as a command to mark the latest captured content as being a good shot. As another example, different types of user interactions with the image capture device may be interested as a command to mark the latest captured content with different levels of rankings.

In some implementations, the user interaction(s) with the image capture device to mark captured content may be detected while the captured content is not being played by the image capture device. For example, the user interaction(s) with the image capture device to mark captured visual content may be detected while the captured visual content is not being presented on the electronic display. For instance, the image capture device may have recorded an image or a video. The user interaction(s) with the image capture device to mark captured content may be detected while the image or the video is not being presented on an electronic display of the image capture device.

In some implementations, the user interaction(s) with the image capture device to mark captured content may be detected while the image capture device is capturing other content. For example, the image capture device may have captured first visual content (e.g., first video). After finishing capture of the first visual content, capture of second visual content (e.g., second video) may be started on the image capture device. The user interaction(s) with the image capture device to mark captured content (e.g., first visual content captured by the image capture device) may be detected during the capture of the second visual content by the image capture device.

The content capture component 104 may be configured to capture content (e.g., visual content, audio content, etc.). The content capture component 104 may be configured to start capture of content and end capture of content. The content capture component 104 may be configured to capture content based on detection of user interaction(s) with the image capture device to control capture of content. Capture of content by the image capture device may include capture of visual content, audio content, and/or other content by the image capture device. Capturing content may include recording, storing, and/or otherwise capturing the content for use in generating image(s), video(s), sound clip(s), and/or other media items. For example, visual content may be captured for use in generating images and/or video frames, and audio content may be captured to provide audio/sound for the images and/or the video frames. Metadata may be captured to provide information about the visual content and/or the audio content.

The content capture component 104 may be configured to capture visual content based on the visual information conveyed by the visual output signal of one or more image sensors and/or other information. The content capture component 104 may be configured to capture separate visual content are separate times. For example, the content capture component may be configured to capture first visual content and/or other content. After the capture of the first visual content, the content capture component may be configured to capture second visual content and/or other content.

Information defining captured content may be stored in the electronic storage 13. For example, visual information defining visual content and/or audio information defining audio content may be stored in the electronic storage 13. Information defining captured content may be stored in one or more tracks. For example, visual content/visual information may be stored in one or more visual tracks, audio content/audio information may be stored in one or more audio tracks, and metadata may be stored in one or more metadata tracks.

The mark component 106 may be configured to mark captured content (e.g., captured visual content, captured audio content, etc.). Marking captured content may include associating the captured content with information that indicates the desirability/quality of the captured content. Marking captured content may include adding information for/into the captured content that indicates the desirability/quality of the captured content. Marking captured content may include tagging the captured content with information that indicates the desirability/quality of the captured content. For example, capture content may be marked with ranking of the captured content. For instance, marking an image or a video may include inserting information into the metadata of the image/video that indicates the user's ranking of the image/video (e.g., good shot, bad shot, favorite shot, delete shot, number/character reflecting the ranking).

The mark component 106 may be configured to mark captured content responsive to detection of the user interaction(s) with the image capture device to mark the captured content. The mark component 106 may be configured to mark the latest content captured by the image capture device. For example, responsive to detection of the user interaction(s) with the image capture device to mark captured content, the mark component 106 may be configured to mark the latest captured visual content (e.g., image, video).

The mark component 106 may be configured to not mark the content being captured by the image capture device when the user interaction(s) with the image capture device to mark the captured content is detected. For example, second visual content (e.g., second video) may be captured after capture of first visual content (e.g., first video). The user interaction(s) with the image capture device to mark the first visual content captured by the image capture device may be detected during the capture of the second visual content by the image capture device. Responsive to the user interaction(s) with the image capture device to mark the first visual content captured by the image capture device being detected during the capture of the second visual content by the image capture device, the mark component may mark the first visual content but not mark the second visual content.

In some implementations, confirmation of the marking of the captured content may be presented on one or more electronic displays. For example, after a recorded image/video has been marked, the marking of the image/video may be visually indicated by one or more text/images presented on electronic display(s) of the image capture device. Confirmation of the marking of the captured content may be conveyed in other ways, such as via playback of sounds and/or vibration of the image capture device.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13 and the image sensor 15 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
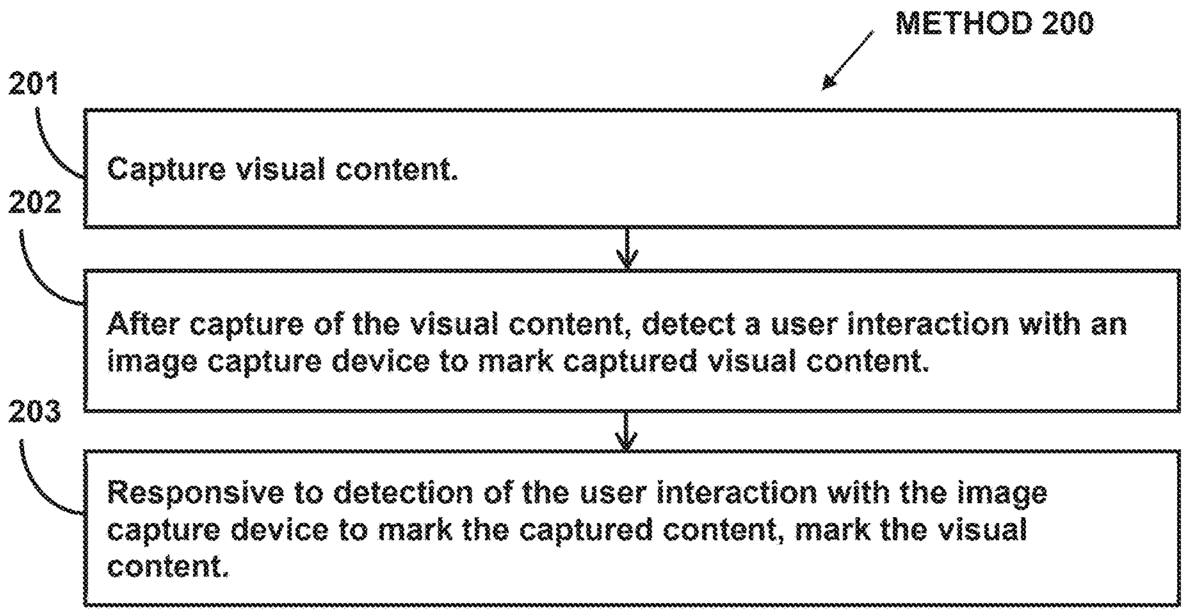
FIG. 2 illustrates an example method for marking content previously captured by an image capture device.

FIG. 2 illustrates method 200 for marking content previously captured by an image capture device. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an optical element, an image sensor, and/or other components. The optical element may guide light within a field of view to the image sensor. The image sensor may generate a visual output signal conveying visual information based on light that becomes incident thereon. The visual information may define visual content.

At operation 201, visual content may be captured based on the visual information conveyed by the visual output signal and/or other information. In some implementations, operation 201 may be performed by a processor component the same as or similar to the content capture component 104 (Shown in FIG. 1 and described herein).

At operation 202, after the capture of the visual content, a user interaction with the image capture device to mark captured visual content may be detected. In some implementations, operation 202 may be performed by a processor component the same as or similar to the user interaction component 102 (Shown in FIG. 1 and described herein).

At operation 203, responsive to detection of the user interaction with the image capture device to mark the captured visual content, the visual content may be marked. In some implementations, operation 203 may be performed by a processor component the same as or similar to the mark component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for marking previously captured content, the image capture device comprising:
- a housing;
- an optical element carried by the housing and configured to guide light within a field of view to an image sensor;
- the image sensor carried by the housing and configured to generate a visual output signal conveying visual information based on light that becomes incident thereon, the visual information defining visual content;
- an electronic display carried by the housing and configured to visually present information; and
- one or more physical processors carried by the housing and configured by machine-readable instructions to:
  - capture first visual content based on the visual information conveyed by the visual output signal;
  - after the capture of the first visual content, detect a user interaction with the image capture device to mark captured visual content, wherein the user interaction with the image capture device to mark the captured visual content is detected while the first visual content is not presented on the electronic display; and
  - responsive to detection of the user interaction with the image capture device to mark the captured visual content, mark the first visual content with a ranking of the first visual content.

2. The image capture device of claim 1, wherein:
- second visual content is captured after the capture of the first visual content;
- the user interaction with the image capture device to mark the captured visual content is detected during the capture of the second visual content; and
- responsive to the detection of the user interaction with the image capture device to mark the captured visual content during the capture of the second visual content, the second visual content is not marked.

3. The image capture device of claim 1, wherein the user interaction with the image capture device to mark the captured visual content includes the user interaction with a physical button or a virtual button of the image capture device.

4. The image capture device of claim 3, wherein the physical button of the image capture device includes a power button of the image capture device.

5. The image capture device of claim 1, further comprising a sound sensor carried by the housing and configured to generate an audio output signal conveying audio information based on sounds received by the sound sensor, the audio information defining audio content, wherein the user interaction with the image capture device to mark the captured visual content includes speaking of a voice command.

6. The image capture device of claim 1, wherein the first visual content is marked with the ranking of the first visual content.

7. The image capture device of claim 1, wherein confirmation of the marking of the first visual content is presented on the electronic display.

8. The image capture device of claim 1, wherein:
- second visual content is captured after the capture of the first visual content; and
- the user interaction with the image capture device to mark the captured visual content is detected during the capture of the second visual content.

9. The image capture device of claim 1, wherein the one or more physical processors are configured by the machine-readable instructions to mark the first visual content with the ranking by inserting information into metadata of the first visual content.

10. The image capture device of claim 1, wherein the one or more physical processors are further configured by the machine-readable instructions to provide a confirmation of the marking of the first visual content by causing a vibration of the image capture device.

11. A method for marking previously captured content, the method performed by an image capture device including an optical element, an image sensor, and one or more processors, the optical element configured to guide light within a field of view to the image sensor, the image sensor configured to generate a visual output signal conveying visual information based on light that becomes incident thereon, the visual information defining visual content, the method comprising:
- capturing first visual content based on the visual information conveyed by the visual output signal;

after the capture of the first visual content, detecting a user interaction with the image capture device to mark captured visual content; and responsive to detection of the user interaction with the image capture device to mark the captured visual content, marking the first visual content, wherein an electronic display is carried by the housing and configured to visually present information, wherein the user interaction with the image capture device to mark the captured visual content is detected while the first visual content is not presented on the electronic display.

12. The method of claim 11, wherein the user interaction with the image capture device to mark the captured visual content includes the user interaction with a physical button or a virtual button of the image capture device.

13. The method of claim 12, wherein the physical button of the image capture device includes a power button of the image capture device.

14. The method of claim 11, wherein a sound sensor is carried by the housing and configured to generate an audio output signal conveying audio information based on sounds received by the sound sensor, the audio information defining audio content, wherein the user interaction with the image capture device to mark the captured visual content includes speaking of a voice command.

15. The method of claim 11, wherein the first visual content is marked with ranking of the first visual content.

16. The method of claim 11, wherein confirmation of the marking of the first visual content is presented on the electronic display.

17. The method of claim 11, wherein:

second visual content is captured after the capture of the first visual content; and the user interaction with the image capture device to mark the captured visual content is detected during the capture of the second visual content.

18. The method of claim 17, wherein responsive to the detection of the user interaction with the image capture device to mark the captured visual content during the capture of the second visual content, the second visual content is not marked.

19. The method of claim 11, wherein marking the first visual content comprises inserting information into metadata of the first visual content indicating a ranking of the first visual content.

20. The method of claim 11, further comprising providing a confirmation of the marking of the first visual content by causing a vibration of the image capture device.

* * * * *